Aug. 1, 1961 G. P. GESSELL 2,994,756
OVERLOAD-RESPONSIVE ELECTRIC MOTOR SHUTOFF ARRANGEMENT
Filed July 18, 1958 2 Sheets-Sheet 2
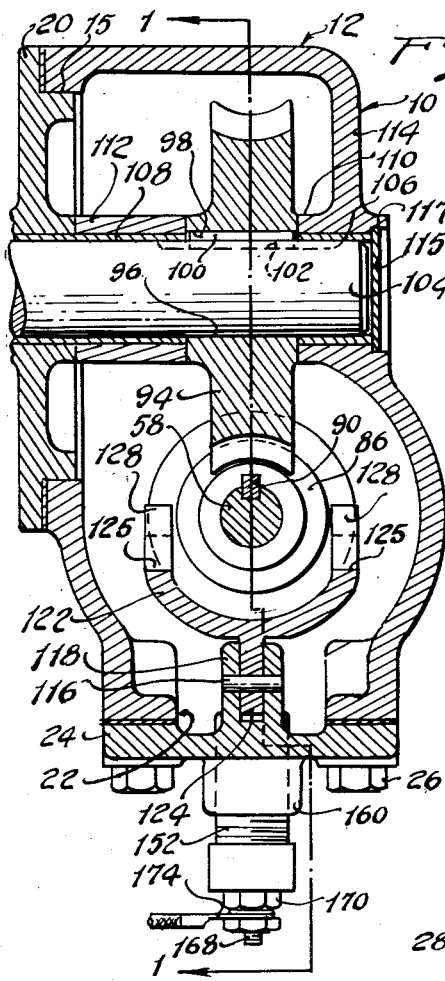
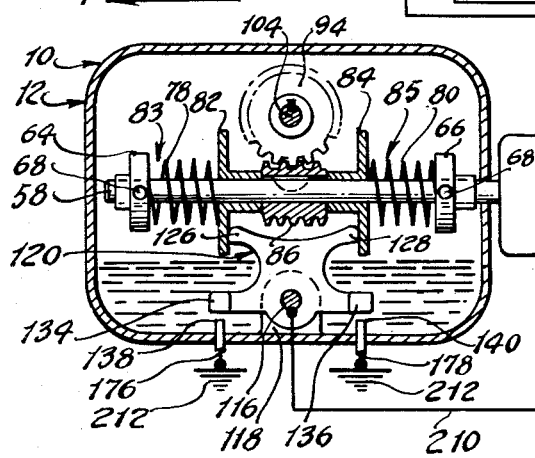
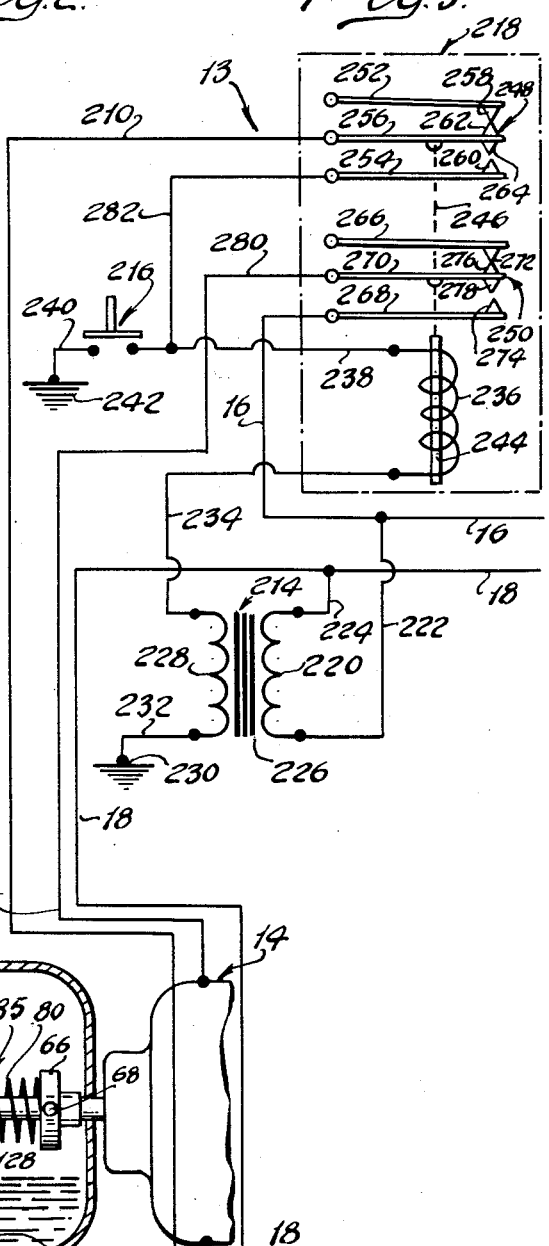
INVENTOR.
GLENN P. GESSELL
BY
Barthel + Bugbee
ATTY'S.

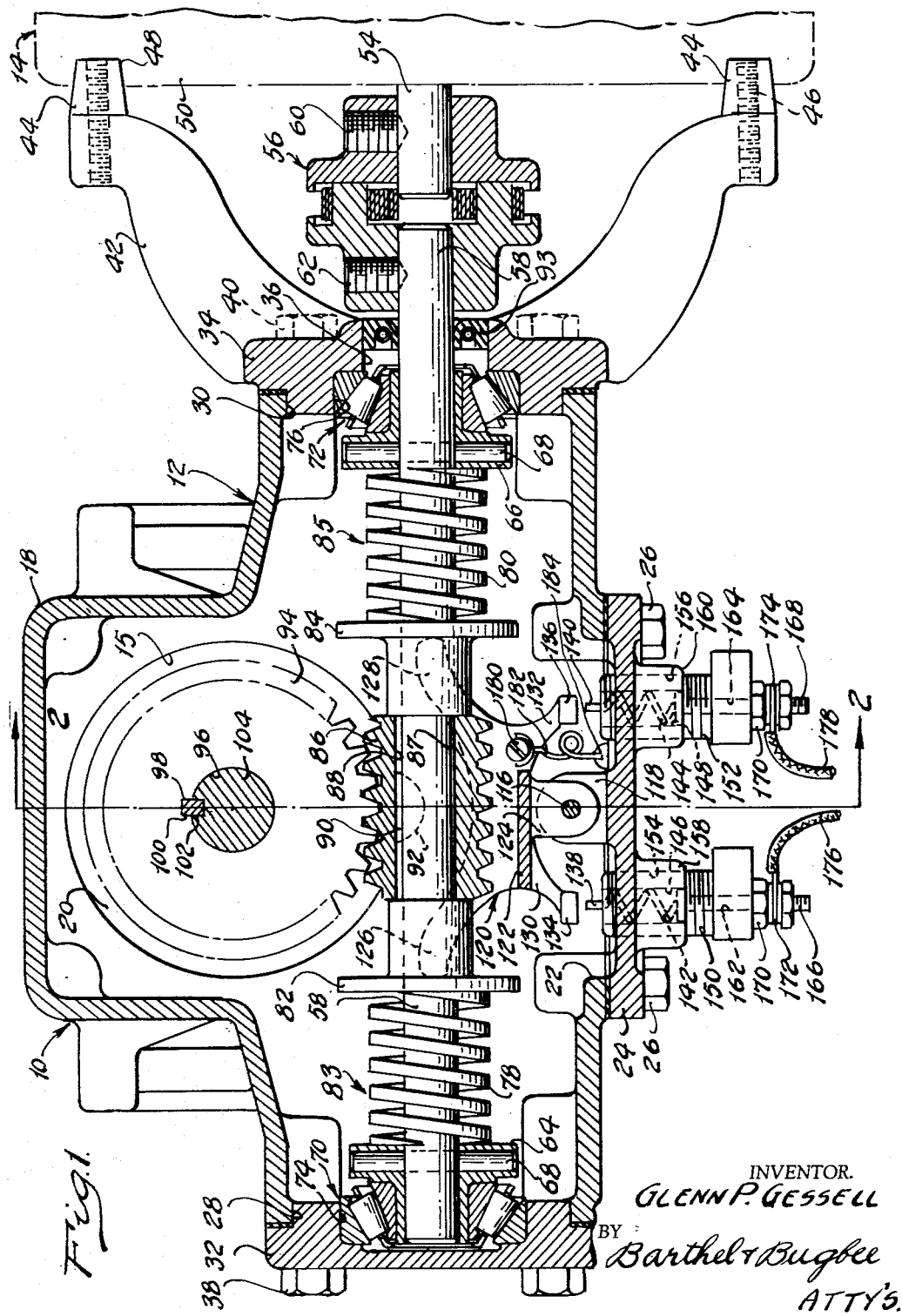

United States Patent Office 2,994,756
Patented Aug. 1, 1961

2,994,756
OVERLOAD-RESPONSIVE ELECTRIC MOTOR
SHUTOFF ARRANGEMENT
Glenn P. Gessell, 930 Lake Shore Road,
Grosse Pointe Shores 36, Mich.
Filed July 18, 1958, Ser. No. 749,404
6 Claims. (Cl. 200—150)

This invention relates to electric motor shutoff arrangements and, in particular, to overload-responsive motor shutoff arrangements.

One object of this invention is to provide an overload-responsive electric motor shutoff arrangement which automatically de-energizes an electric motor by positively operating mechanism which actuates a motor-energization control switch immediately upon the development of an overload transmitted to the output shaft of the power unit, without requiring delicate and undependable thermostats, thermal switches or other similar instrumentalities which might fail under emergency conditions or after an extended period of disuse.

Another object is to provide an overload-responsive electric motor shutoff arrangement of the foregoing character which can be adjusted during use to vary the extent of overload necessary to operate the device.

Another object is to provide an overload-responsive electric motor shutoff arrangement of the foregoing character wherein the extent of overload necessary to actuate the arrangement in one direction can be adjusted so as to be different from that necessary to actuate it in the opposite direction as, for example, in operating a large garage door which is very heavy to lift but requires very little power to lower.

Another object is to provide an overload-responsive electric motor shutoff arrangement of the foregoing character wherein the means of adjustment is accessible from a completely external position, without requiring access to the interior for such adjustment, thereby ensuring safety of adjustment during operation without halting the motor, whereby to enable the precise adjustment of the installation under loaded operating conditions.

Another object is to provide an overload-responsive electric motor shutoff arrangement wherein the contacts of the switches or circuit breakers are immersed in oil or other suitable liquid which quenches any sparks arising during operation and thus insures explosion-proof operation.

Another object is to provide an overload-responsive electric motor shutoff arrangement of the foregoing character wherein there is no preload imposed upon such bearings, so that friction is reduced, wear decreased and less power required for operation.

Another object is to provide an overload-responsive electric motor shutoff arrangement of the foregoing character which, because of the above-mentioned features, is particularly well adapted for use under heavy duty operating conditions.

Other objects and advantages of the invention will become apparent during the course of the following description of the accompanying drawings, wherein:

FIGURE 1 is a central vertical longitudinal section through an overload-responsive motor shutoff arrangement, according to one form of the invention, taken along the line 1—1 in FIGURE 2, with certain parts shown in side elevation and with the operating parts in their normally-operating positions without the presence of an overload;

FIGURE 2 is a vertical cross-section taken along the line 2—2 in FIGURE 1; and

FIGURE 3 is a diagrammatic representation of one of the electrical operating circuits in which the motor shut-off arrangement of FIGURE 1 can be installed and used.

In general, the present invention provides a heavy duty overload-responsive motor shutoff arrangement which, when used in an appropriate electrical circuit, immediately shifts a control switch in the electric motor energization circuit so as to immediately de-energize the motor energization circuit and halt the motor when an overload develops in the mechanism driven by the motor, such as when an obstruction is encountered in such mechanism. In this manner, the motor is prevented from continuing in operation, consequently preventing overheating and resultant damage to the motor. Moreover, the actuating mechanism of the overload-responsive motor shutoff arrangement of the present invention is primarily mechanical and hence is free from the defects of non-mechanical safety shutoff arrangements, the mechanism of the arrangement positively actuating either one of a pair of overload control switches upon the development of an overload in either direction of operation, the actuation of either of these switches in turn de-energizing the motor energization circuit.

Referring to the drawings in detail, FIGURES 1 and 2 show a heavy duty overload-responsive electric motor shutoff arrangement, generally designated 10, driven by a motor 14 energized by an electric circuit 13 through power current supply lines 16 and 18. The arrangement 10 is enclosed in an oil-tight housing 12 having side and bottom access openings 15 and 22 closed by side and bottom closure covers 20 and 24 respectively. The closure plate 24 is bolted or otherwise secured to the housing 12 as at 26. The housing 12 also has opposite end access openings 28 and 30 respectively closed by end caps 32 and 34, the end cap 32 being solid and the end cap 34 having a central bore 36 therethrough. The end caps 32 and 34 are bolted or otherwise secured at 38 and 40 in their respective openings 28 and 30. The end cap 34 is adapted to support the arrangement 10 by means of a four-armed arcuate bracket 42 integral therewith, the upper and lower ends of which are mounted on the motor 14 through conical plugs 44 by means of threaded studs 46 threaded therein, the plugs 44 being seated in correspondingly conical sockets 48 in the housing 50 of the electric driving motor 14. The latter is of conventional construction and its details, as well as its mounting means, are beyond the scope of the present invention. Such motors customarily are provided with a base integral with their housing and this base is ordinarily bolted to a suitable supporting structure.

The motor 14 has the usual armature shaft 54 which is connected by a conventional coupling 56 to the input shaft 58 of the motor shutoff arrangement 10, the coupling 56 having set screws 60 and 62 respectively by which the opposite ends of the coupling 56 are secured to the shafts 54 and 58 respectively. The shaft 58 carries flanged spring abutment collars 64 and 66 near its opposite ends within the housing 10, the shaft 58 and the collars 64 and 66 being drilled transversely to receive coupling pins 68 by which the collars 64 and 66 are drivingly secured to the shaft 58 inwardly of the end caps 32 and 34. The collars 64 and 66 and consequently the opposite end portions of the shaft 58 are rotatably supported by spaced opposed tapered roller bearing assemblies 70 and 72 respectively mounted within recesses 74 and 76 in the end caps 32 and 34, the recess 76 in effect being a counterbore of the bore 36 and also coaxial therewith. In this manner, any end thrust on the shaft 58 developing during operation in either axial direction is sustained by one of the tapered roller bearing assemblies 70 or 72 and extremely heavy loads are easily handled without, however, requiring pre-stressing of the bearing assembly.

Engaging the spring abutment collars 64 and 66 are the outer ends of helical compression springs 78 and 80 respectively (FIGURE 1), the innner ends of which engage flanged thrust collars 82 and 84 slidably mounted on the shaft 58, the assemblies of these elements collectively forming resilient thrust devices, generally designated 83 and 85 respectively. The inner ends of the flanged thrust collars 82 and 84 engage the opposite ends of an axially-movable worm 86 which is provided with a central bore 87 containing a longitudinal keyway 88 engaged by a Woodruff key 90 seated in an arcuate radial key seat 92 in the shaft 58. As a result, the worm 86 is drivingly connected to the shaft 58 yet is free to slide axially therealong without interrupting this driving connection. Bore 36 of cap 34 carries an oil seal 93 for shaft 58.

Meshing with the worm 86 is a worm wheel or worm gear 94 (FIGURES 1 and 2) which is centrally bored at 96 and grooved at 98 to receive a key 100, the latter being mounted in a key seat 102 in an output shaft 104. The opposite ends of the output shaft 104 are mounted in sleeve bearings 106 and 108 (FIGURE 2) carried by internally-bored bearing bosses 110 and 112 respectively in the front wall 114 of the housing 12 and the side access plate 20 respectively. A closure disc 115 closes the housing opening 117 in the front wall 114 of the housing 12 at the forward end of the output shaft 104. The output shaft 104 is connected in any suitable manner (not shown) to the mechanism driven by the motor 14 through the intermediate agency of the overload-responsive motor shutoff arrangement 10. Typical mechanism or machines or articles driven in this manner are the garage door installation already mentioned, travelling conveyors, or any other machine or installation subject to overload transmitted to a shaft.

Pivotally mounted on a pivot pin 116 which is mounted in upstanding ears 118 (FIGURES 1 and 2) on the inside of the access plate 24 is the double-armed rocking switch actuator 122 constituting the upper part of a single-pole double-throw overload switch, generally designated 122. The rocking switch actuator 122 has a central portion from which a lug 124 extends downward and is drilled to receive the pivot pin 116. The central portion is approximately the shape of a segment of a hollow cylinder from the opposite ends of the opposite edges 125 of which spaced pairs of upwardly-inclined oppositely-facing fingers 126 and 128 extend oppositely into engagement with the flanged collars 82 and 84 respectively. Extending downwardly from the opposite ends of the central portion of the switch actuator 122 are inclined arms 130 and 132 respectively, the ends of which constitute upper switch contacts 134 and 136 which are spaced away from the opposing cooperating lower switch contacts 138 and 140 respectively yieldingly mounted on the upper ends of resilient elements or contact springs 142 and 144. The contact springs 142 and 144 are seated in recesses 146 and 148 in insulating plugs 150 and 152 threaded into threaded vertical bores 154 and 156 in spaced bosses 158 and 160 depending from the lower closure plate 24. The insulating plugs 150 and 152 are conveniently made of nylon plastic which is an excellent insulator yet is easily machined, and are provided with bores 162 and 164 through which pass threaded conductor rods 166 and 168. The upper ends of the conductor rods 166 and 168 are connected to the contact springs 142 and 144 respectively, and their lower ends receive lock nuts 170 by which they are connected to the terminals 172 and 174 of wires or other conductors 176 and 178 respectively.

In order to provide an independent electrical connection between the switch actuator 122 and the housing 12, the former is drilled and threaded to receive a binding screw 180 to which is secured the upper end of a bridging wire or jumper 182, the lower end of which is secured by a binding screw 184 threaded into the closure plate 24 which, as previously stated, is bolted to the housing 12.

The overload-responsive electric motor shutoff arrangement 10 is connected in any suitable electrical operating circuit, the simplified circuit 13 being characteristic of such circuits but not the sole circuit usable. The housing 12 is grounded by the line 210 to a metallic portion of the installation. The contact rods 166 and 168 are grounded as at 212 through the lines 176 and 178, the grounds 212 consisting of a metallic portion of the installation or structure upon which the arrangement 10 is mounted and which extends to other parts of the installation, in order to avoid the necessity of using interconnecting wiring. The contact rods 166 and 168, as stated above, are connected to the spring contacts 138 and 140 on the upper ends of the springs 142 and 144.

Apart from the overload-responsive motor shutoff arrangement 10 and the electric motor 14, the control and energization circuit 13 of the overload-responsive motor shutoff arrangement 10 includes a step-down transformer 214, a normally-open motor starting push button switch 216 and a conventional latching relay 218. The stepdown transformer 214 has a primary winding 220 which is continuously energized to the lines 222 and 224 from the current supply lines 16 and 18 so long as the lines 16 and 18 themselves are energized. The transformer 214 has the usual iron core 226 and secondary winding 228, one end of which is grounded as at 230 by the line 232 to the same metallic or other conducting structure as the ground 212 of the contact rods 166 and 168.

From the opposite end of the transformer secondary winding 228, the line 234 runs to one end of the operating coil 236 of the latching relay 218, from the opposite end of which coil the line 238 runs to one pole of the normally open motor starting push button switch 216. From the opposite pole of the push button switch 216, the line 240 is grounded as at 242 to the same metallic or other conducting structure as the previously-mentioned grounds 212 and 230. The operating coil 236 of the latching relay 218 operates an armature 244 having a contact-operating link 246 for altering the energization of upper and lower relay contact sets 248 and 250 respectively.

The upper contact set 248 includes two fixed arms 252 and 254 between which is a movable intermediate arm 256. The upper and lower fixed arms 252 and 254 are provided with single contacts 258 and 260 respectively engageable with oppositely-facing movable contacts 262 and 264 of the upper and lower sides of the movable arm 256 alternately engageable with the fixed contacts 258 and 260. In a similar manner, the lower contact set 250 includes fixed upper and lower contact arms 266 and 268 between which is a movable intermediate arm 270. The fixed contact arms 266 and 268 are provided with single contacts 272 and 274, whereas the movable contact arm 270 is provided with oppositely-facing contacts 276 and 278 alternately engageable with the fixed contacts 272 and 274. The armature link 246 is connected to the upper and lower intermediate contact arms 256 and 270, and in the off position condition of the latching relay 218, the contacts of the upper and intermediate arms 252—256 and 266—270 are alternately closed and opened in response to the energization of the operating coil 236 to close the circuit between the intermediate arms 256 and 270 and the lower arms 254 and 268 respectively, as explained below in connection with the operation of the invention.

The latching relay 218, as its name suggests, is of a well-known type having a mechanical latching arrangement (not shown) operated by alternate energizations of the operating coil 236 and consequent alternate shifting of the armature 244 and armature link 246. Alternate energizations of the operating coil 236 first hold the contact 264 of the upper movable arm 256 in engagement with the contact 260 of the upper contact set 248 while holding the contact 278 of the lower movable arm 270 in engagement with the lower contact 274 of the lower contact set 250; and next release the latching device to release these contacts so that they return to their original position shown in FIGURE 3. In other words, the first energization holds the contacts 264—260 and 278—274 in engagement, the next energization releases the latch and permits their disengagement, the third energization re-engages them, the fourth energization again permits their disengagement, and so forth indefinitely. The latching mechanism of the latching relay 218 is primarily mechanical rather than electrical, although operated by the shifting of the armature 244, and its details are beyond the scope of the present invention. They will be found disclosed in the Bergemann Patent No. 2,531,838 of Nov. 28, 1950, for Latching Relay, and such latching relays of this patented construction are commonly available on the open market.

The current supply line 16 is connected directly to the lower contact arm 268 of the lower contact set 250, whereas the line 280 runs from the contact arm 270 of the lower contact set 250 to the motor 14, to the opposite pole of which is connected the current supply line 18. From the line 238, a branch line 282 runs to the lower contact arm 254 of the upper contact set 248, the line 210 being connected to the movable contact arm 256 thereof.

In the operation of the invention, let is be assumed that the power output shaft 104 of the overload-responsive motor shutoff arrangement 10 is connected to the load to be moved, such as, for example, to a garage door operator, or to a conveyor. Let it also be assumed that the springs 78 and 80 have been chosen of such force that they will compress properly and to the desired extent upon the development of an overload backing up through the power output shaft 104. Let is also be assumed that the switch contacts 138 and 140 on the contact springs 142 and 144 have been spaced at the desired distances from the switch contacts 134 and 136 of the arms 130 and 132 on the switch actuator 122 by screwing the insulating plugs 150 and 152 upward or downward in their respective bores 154 and 156. The housing 12 is of course filled with lubricating oil to a depth sufficient to lubricate the worm wheel 94, worm 86, bearings 70 and 72 of the power input shaft 58 (FIGURE 1), as well as the bearings 106 and 108 (FIGURE 2) of the power output shaft 104. This lubricating oil at such depth necessarily covers the contacts of the overload switch 120, thus not only lubricating the moving parts just mentioned but also quenching any sparks occurring at the contacts of the switch 120 and thereby rendering the arrangement explosion-proof, as set forth above in the statement of the objects of the invention.

To start the load-moving mechanism in operation from the power output shaft 104, the operator depresses the motor starting push button switch 216, which also alternately serves as a motor-stopping push button switch. The closing of the switch 216 completes the energization circuit of the operating coil 236 of the latching relay 218 from the secondary winding 228 of the stepdown transformer 214 (the primary winding 220 of which, as previously stated, is continuously energized from the current supply lines 16 and 18) by way of the lines 234, 238, the now closed push button switch 216, the line 240, the ground connections 242 and 230 and the line 232, completing the circuit.

The first energization of the operating coil 236 of the latching relay 218 draws down the armature 244 and armature link 246 and with them the movable contact arms 256 and 270, engaging their contacts 264 and 278 with the fixed contacts 260 and 274 respectively, while at the same time the latching mechanism shown and described in the Bergemann Patent 2,531,838 of November 28, 1950, holds these contacts in engagement even though the operator immediately releases the push button switch 216 and thereby de-energizes the latching relay operating coil 236.

As a result, the motor 14 is energized directly from the current supply line 18 and indirectly from the current supply line 16 by way of the fixed lower switch arm 268 and contact 274 and movable contact 278 and movable switch arm 270 of the lower contact set 250 of the latching relay 218 and the line 280 from the movable contact arm 270 of the lower contact set 250 to the motor 14, completing the circuit. The motor 14 therefore starts running and rotates the power input shaft 58 and worm 86 slidably keyed thereto, thereby rotating the worm wheel 94 and the power output shaft 104 so as to operate the particular load driven thereby, such as the garage door operator, conveyor or the like.

If, now, an overload develops in the mechanism driven by the power output shaft 104 of the overload-responsive operating arrangement 10, the shaft 58 and worm wheel 94 keyed thereto slow down and possibly stop, whereupon the continued rotation of the power input shaft 58 causes the worm 86 to thread its way along the toothed periphery of the worm wheel 94 axially relatively to the shaft 58 and pushing the thrust collar 82 or 84 along the shaft 58, compressing its respective spring 78 or 80, rocking the switch actuator 122 until its upper switch contact 134 or 136 engages its respective opposing lower switch contact 138 or 140. This action closes the circuit between the ground connection 212 and the line 210. The consequent closing of the circuit through the latched-together relay contact arms 256—254 and 270—268 re-energizes the operating coil 236 of the latching relay 218 momentarily through the above-described contact arms and the lines 210, 282, 238, 234 and 232 by way of the transformer secondary winding 228 to the respective grounds 230 and 212, completing the circuit.

The momentary energization of the operating coil 236 releases the latching mechanism described in the above-identified Bergemann Patent No. 2,531,838, thereby releasing the movable relay contact arms 270 and 256 to spring upward to the position shown in FIGURE 4, and consequently de-energizing the motor energization circuit by breaking the circuit between the lines 16 and 280 at the now separated contacts 274 and 278. Customarily, the motor 14 is reversible or has associated with it an automatic reversal device whereby, upon the operator's again depressing the motor starting switch 216, the motor 14 will rotate in the reverse direction to tend to remove or expel the obstruction or other overload cause from the mechanism. This reversal arrangement is conventional and forms no part of the present invention, and therefore it is omitted in order to simplify the showing. In either case, the subsequent or second energization of the motor starting switch 216 in re-energizing the operating coil 236 of the latching relay 218 recloses and latches the motor energization circuit in its closed position, as described above for the first depressing of the motor starting switch 216.

What I claim is:

1. An overload-responsive electric motor shutoff arrangement for connection between an electrically-controlled driving motor and a driven apparatus, said arrangement comprising a lubricant-tight housing adapted to be filled with a lubricant, rotary power input and output shafts journaled in said housing and adapted to be connected to the driving motor and driven apparatus respectively, a worm gear drivingly connected to said output shaft, a substantially straight worm disposed below said worm gear and slidably mounted on said input shaft with a sliding driving connection therebetween and meshing with said worm gear, resilient thrust devices axially slidably mounted on said input shaft and yieldingly engaging the opposite ends of said worm, and normally-inoperative electric switch means mounted in said housing below the intended level of lubricant therein, said switch means including a switch actuator movably mounted on said housing in engagement with said thrust devices and movable back and forth relatively to said input shaft in response to the sliding of said worm back and forth along said input shaft, said switch actuator having upper switch contacts connected thereto and said normally-inoperative electric switch means also including lower switch contacts mounted on said housing and operatively engageable with said upper switch contacts of said switch actuator upon motion of said switch actuator in response to axial travel of said worm relatively to said worm gear along said input shaft as a result of the retardation of rotation of said output shaft from an overload in the apparatus drivingly connected thereto whereby the lubricant in said housing not only lubricates the moving parts of said arrangement but also quenches any sparks occurring at said switch contacts so as to render said arrangement explosion-proof.

2. An overload-responsive electric motor shutoff arrangement, according to claim 1, wherein the journalling of said input shaft includes spaced opposed tapered roller bearing assemblies mounted in said housing and rotatably supporting said input shaft against end motion therealong.

3. An overload-responsive electric motor shutoff arrangement, according to claim 1, wherein the switch actuator is rockably mounted in the lower part of said housing.

4. An overload-responsive electric motor shutoff arrangement, according to claim 3, wherein said switch contacts are engageable with one another in response to rocking of said switch actuator.

5. An overload-responsive electric motor shutoff arrangement, according to claim 1, wherein said switch means also includes a pair of spaced lower switch contact supports of electrically-insulating material adjustably mounted in said housing for motion toward and away from said switch actuator, said lower switch contacts being mounted on said switch contact supports.

6. An overload-responsive electric motor shutoff arrangement, according to claim 1, wherein resilient elements are mounted in said housing and wherein said lower switch contacts are yieldingly mounted upon said resilient elements.

References Cited in the file of this patent

UNITED STATES PATENTS

| | | |
|---|---|---|
| 759,916 | Von Recklinghausen | May 17, 1904 |
| 1,479,178 | Harvey | Jan. 1, 1924 |
| 2,464,847 | Coffey | Mar. 22, 1949 |
| 2,517,373 | Ambrose | Aug. 1, 1950 |
| 2,666,119 | Becker | Jan. 12, 1954 |